(12) United States Patent
Sugai et al.

(10) Patent No.: US 6,593,673 B1
(45) Date of Patent: Jul. 15, 2003

(54) ELECTRONIC DEVICE HAVING COOLING UNIT

(75) Inventors: Toshimichi Sugai, Tokyo (JP); Teruaki Kuwana, Tokyo (JP); Katsunori Gendo, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/656,254

(22) Filed: Sep. 6, 2000

(30) Foreign Application Priority Data

Sep. 8, 1999 (JP) ............................. 11-254659
Sep. 1, 2000 (JP) ........................ 2000-266191

(51) Int. Cl.[7] ............................................ H01H 35/00
(52) U.S. Cl. ...................................... 307/116; 361/695
(58) Field of Search ................. 307/116, 117, 307/125, 130, 131; 702/132; 361/695, 396, 397

(56) References Cited

U.S. PATENT DOCUMENTS

| 5,612,677 A | * | 3/1997 | Baudry | 340/521 |
| 5,848,282 A | * | 12/1998 | Kang | 361/695 |
| 5,864,465 A | * | 1/1999 | Liu | 174/16.3 |
| 5,930,736 A | * | 7/1999 | Miller et al. | 318/471 |
| 5,962,933 A | * | 10/1999 | Henderson et al. | 307/116 |
| 6,014,611 A | * | 1/2000 | Arai et al. | 702/132 |
| 6,020,820 A | * | 2/2000 | Chiang | 340/584 |
| 6,243,656 B1 | * | 6/2001 | Arai et al. | 702/132 |
| 6,259,172 B1 | * | 7/2001 | Lee | 307/116 |
| 6,320,734 B1 | * | 11/2001 | Sonobe et al. | 361/103 |

FOREIGN PATENT DOCUMENTS

| JP | 04-4804 | * | 7/1993 | G06F/1/20 |
| JP | 8126191 | | 5/1996 | |
| JP | 1093010 | | 4/1998 | |
| JP | 10126080 | | 5/1998 | |

OTHER PUBLICATIONS

Patent Abstracts of Japan, Pub. No. 05–189087, Date: Jul. –1993. Machine translation of JP–04–4804.*

* cited by examiner

*Primary Examiner*—Brian Sircus
*Assistant Examiner*—Sharon A. Polk

(57) ABSTRACT

In an electronic device mounting an electronic circuit module on which electronic components are mounted and having a fan that discharges air from inside the electronic device to an outside of a component when the electronic circuit module operates, the electronic device having an exhaust port provided on a side wall of the component, a duct provided so as to contact the exhaust port on an inside of the component, and a fan portion provided on the duct inside the component. Accordingly, the exhaust from the fan portion passes through the duct and is discharged from the exhaust port, with the airflow generated inside the component able to prevent a rise in temperature inside an electronic circuit module such as a personal computer or television game device due to heat generated from the electronic components mounted on an electronic circuit module.

10 Claims, 13 Drawing Sheets

ELECTRONIC DEVICE HAVING COOLING UNIT

BACKGROUND OF THE INVENTION

1. Technical Field of the Invention

The present invention relates to an electronic device such as a personal computer or TV video game unit having cooling unit that prevents the temperature from rising inside an electronic circuit module due to heat generated by electronic components mounted on an electronic circuit module.

2. Description of the Related Art

In recent years, as TV video games and laptop-type personal computers have become more sophisticated, the electronic components used therein have become more densely concentrated and the speed with which the integrated circuits operate has increased. As a result, the temperature increase caused by heat generated by electronic circuit modules composed of a plurality of electronic components can damage and sometimes even destroy beyond repair the integrated circuits themselves.

Generally, the heat generated by electronic components increases as power consumption and operating speed increase, so the electronic circuit module requires a cooling unit to restrain the temperature rise.

Typically, in such types of electronic circuit modules, forked radiator panels or a cooling fan are mounted on the heat-producing element in order to forcibly cool the unit.

Additionally, there are radiators for electronic devices that contact an aluminum block surface with the heat-producing element and conduct the generated heat to a fan via a heat pipe, the fan then discharging the heat externally.

For example, the radiator internal to the electronic device disclosed in Japanese Laid-Open Patent Application No. 10-126080 consists of a single piece of hollow extruded aluminum, comprising on an intake side a heat transfer portion for transferring heat received externally from within the electronic circuits to an internal flow of air, a flow duct on an exit side having a fan compartment shaped so as to accommodate an exhaust fan, and an exhaust fan contained within the fan compartment of the air flow duct, with air introduced from outside the electronic device sent through the air flow duct and discharged outside the electronic device.

Additionally, an electronic circuit module comprising a temperature sensor installed on an electronic circuit module that senses a module temperature, a first-stage temperature setting unit that outputs a signal indicating that a first-stage temperature has been exceeded when the module temperature measured by the temperature sensor exceeds a previously determined first-stage temperature, a fan unit that cools the electronic circuit module that is triggered by the output signal of the first-stage temperature setting unit, a second-stage temperature setting unit that outputs a signal indicating that a second-stage temperature has been exceeded when the module temperature measured by the temperature sensor exceeds a previously determined second-stage temperature, and a power cutoff unit that cuts off the supply of power to the electronic circuit module in response to the output signal from the second-stage temperature setting unit, is described in Japanese Laid-Open Patent Application No. 8-126191.

Moreover, a configuration in which, when a temperature detection signal from a temperature sensor detecting a temperature in the vicinity of an image processing LSI which generates a large amount of heat is output to a temperature monitoring microprocessor, a cooling fan is triggered when the temperature detected by the microprocessor is greater than a first threshold value, and a clock stop signal is output and the operation of the LSI is stopped when the temperature detected by the microprocessor is greater than a second threshold value, is disclosed in Japanese Laid-Open Patent Application No. 10-93010.

However, the conventional method of simply mounting forked radiator panels on the heat-producing element requires space for the radiator panels and is unsuitable when it comes to making electronic control devices compact.

Additionally, the method of cooling simply using a fan requires that, in order to increase the cooling effect, the size of the fan be increased or that the rpm of the fan be increased so as to increase the exhaust volume. Increasing the rotation speed of the fan also further increases the fan rotation noise. Furthermore, if for some reason the fan did not turn, the electronic circuit module could overheat.

In a cooling device that conducts heat from a heat-producing element via a heat pipe to a fan to be discharged externally, the device is a single unit from the portion that receives the heat from the heat-producing element to the portion of the fan that dissipates the heat, so if trouble occurs it is not possible to replace just the defective part. Instead, the entire unit must be replaced, leading inevitably to an increase in parts costs.

Most fundamentally, complicated cooling units with a large number of component parts complicate the work of installing and removing the units.

Moreover, as with the devices described in the publications mentioned above, the system of sensing the temperature of heat-producing elements inside the electronic module and, in response to an overheated state, using a temperature sensing microprocessor to vary or decrease the rotational speed of the cooling fan or the operating frequency of the integrated circuit and cutting the electronic module power or operating frequency, requires specialized circuits such as temperature sensors; temperature setting units and temperature monitoring microprocessors, which of course increases the cost.

SUMMARY OF THE INVENTION

The present invention was conceived with the above-described points in mind, and in order to remedy the disadvantages of electronic device cooling units, has as its object to provide a cooling unit for an electronic control device that comprises fewer parts and is thus easier to assemble, and at the same time reduces fan noise leaking to the outside by moving the fan away from the ventilation holes in the electronic device, takes a comprehensive view of thermal design by stopping the operation of the electronic circuit in the event that the fan stops rotating so as to prevent overheating, has a simple construction that moreover does not take space, is low-cost, and further, while of course preventing misoperation due to heat generated by the electronic circuit module and maintaining safety, can also cool compact, lightweight devices.

The electronic device having a cooling unit according to the present invention comprises an electronic device mounting an electronic circuit module on which electronic components are mounted and having a fan that discharges air from inside the electronic device to an outside of a component when the electronic circuit module operates, the electronic device having an exhaust port provided on a side wall of the component, a duct provided so as to contact the exhaust port on an inside of the component, and a fan portion provided on the duct inside the component, as a result of which it becomes possible to reduce the noise of the fan during rotation.

Additionally, the duct has an intake opening formed on an exterior of the casing and an exhaust opening connected to the exhaust port provided on the side wall of the component, as a result of which air discharged by the fan can be discharged externally without loss.

Additionally, the fan portion is provided on an edge of the electronic circuit board inside the component, as a result of which heat transmitted across the surface of the electronic circuit board the can be efficiently discharged externally.

Further, the fan portion hangs from the exhaust port provided in the side wall of the component, so the height of the fan portion can be lowered by designing the component accordingly.

Additionally, in an electronic device mounting an electronic circuit module on which electronic components are mounted and having a shield plate shielding the electronic circuit board so as to prevent leakage of electromagnetic waves from the electronic circuit module, a heat-receiving plate is attached to said shield plate at a mounting surface of the electronic module, a contacting portion of said heat-receiving plate contacts a high-temperature heat-producing element mounted on the electronic circuit board and another portion of the heat-receiving plate is led to a vicinity of a fan that discharges air inside the electronic device to the outside of the electronic device, as a result of which the heat produced by the high-temperature heat-producing element is received by the contacting portion of the heat-receiving plate and then dissipated to the heat-receiving plate attached to the shield plate, and at the same time the fan can efficiently discharge heat transferred to the heat-receiving plate to the outside of the electronic device.

Further, the high-temperature heat-producing element contacts a surface of the heat-receiving plate via a heat-transferring buffer, so the heat-transferring buffer maintains the surface contact between the heat-producing element and the heat-receiving plate despite slight deformations of the heat-receiving plate and it is possible to maintain superior heat-transfer capability without degradation of heat-transfer capability.

Additionally, the heat-receiving plate has an attachment surface that attaches to the shield plate and at the same time a portion of the heat-receiving plate that contacts the surface of the high-temperature heat-producing element has a heat-receiving surface of a height that varies according to a height of each of a plurality of high-temperature heat-receiving elements, each height continuous with the attachment surface via a step, so a heat-receiving plate consisting of a single member is sufficient for even a plurality of heat-producing elements, reducing the number of parts and simplifying production.

Additionally, because the heat-receiving plate comprises a cooling section adjacent to an intake port of the fan portion and heat-dispersing fins projecting from a front surface of said cooling section, the surface area exposed to the passage of the flow of air from the fan is increased and the cooling efficiency of the heat-receiving plate can be further enhanced.

Further, the shield plate on a non-mounting surface of the electronic module has a contacting portion that contacts an electronic circuit board at a rear of a high-temperature heat-producing element, said contacting portion contacting an electronic circuit board surface via the heat-transferring buffer, so heat generated by the high-temperature heat-producing element can be dissipated to the shield plate from a rear of the mounting surface and at the same time a strong structure achieved by supporting the electronic circuit board.

Additionally, the heat-receiving plate comprises an aluminum plate, as a result of which heat transfer capability is enhanced and heat can be dissipated efficiently.

Additionally, in an electronic device mounting an electronic circuit module on which electronic components are mounted and having a fan that discharges air inside the electronic device to an outside of a component when the electronic circuit module operates, the electronic device comprises a fan operating output means for detecting a rotation of a fan and operating control means for controlling an operation of the electronic circuit module based on an operating signal from said fan operating output means, as a result of which the operation of the electronic module is adjusted when the fan rotation is stopped due to the fan operating output signal, so additional heat generation can be prevented.

Additionally, the operating control means for controlling the operation of the electronic circuit module stops a clock generator that supplies a clock pulse to the electronic circuit module, as a result of which the oscillation of the clock signal is stopped by stopping the rotation of the fan, so the operation of the integrated circuits of the electronic circuit module is stopped and heat generation can be prevented.

Further, the operating control means for controlling the operation of the electronic circuit module turns power on and off, as a result of which the power is cut off when the rotation of the fan motor stops, so heat generation of the electronic circuit can be prevented.

Additionally, because the fan operating output means outputs a presence or absence of a rotation of the fan as a binary digital signal, the operating condition of the fan can be judged accurately.

Additionally, because the fan operating output means has delaying means for delaying a rotation detection signal for detecting the rotation of the fan, even if the rotation detection signal is input only intermittently the clock pulse need not be turned ON and OFF each time and thus the operation of the integrated circuit to which the clock pulse is supplied can be stabilized.

Additionally, because the fan operating output means converts to a numerical value level corresponding to the rotational state of the fan, ascertains the rotational state of the fan based on said converted numerical value, and outputs a detection signal corresponding to said fan, the rotation condition of the fan can be divided into a plurality of stages and determined accordingly, and if for some reason the fan rpm declines the clock pulse need not be stopped immediately but instead the user can be notified of the occurrence of trouble with the fan while the operation of the integrated circuit continues.

Additionally, because the operating control means changes in stages a clock pulse frequency output to the electronic circuit module in response to the detection signal output from the fan operating output means, the operation of the integrated circuits on the electronic circuit module can be decreased in stages according to the operating condition of the fan, and at the same time as trouble occurs with the fan the clock pulse can be stopped, to ease the burden on the user.

Additionally, because the fan operating output means is triggered by an image synchronization signal and detects the rotational state of the fan, there is no need to provide a special signal generating means in order to monitor the rotation condition of the fan and thus the structure can be simplified and costs can be held down.

Other objects, features and advantages of the present invention will become apparent from the following detailed description when read in conjunction with the accompanying drawings.

BRIEF DESCRIPTION OF THE DIAGRAMS

DETAILED DESCRIPTION OF THE PREFERRED EMBODIMENTS

A description will be given of embodiments of the cooling unit of the electronic control device according to the present invention, with reference to the accompanying drawings.

Figure 1:
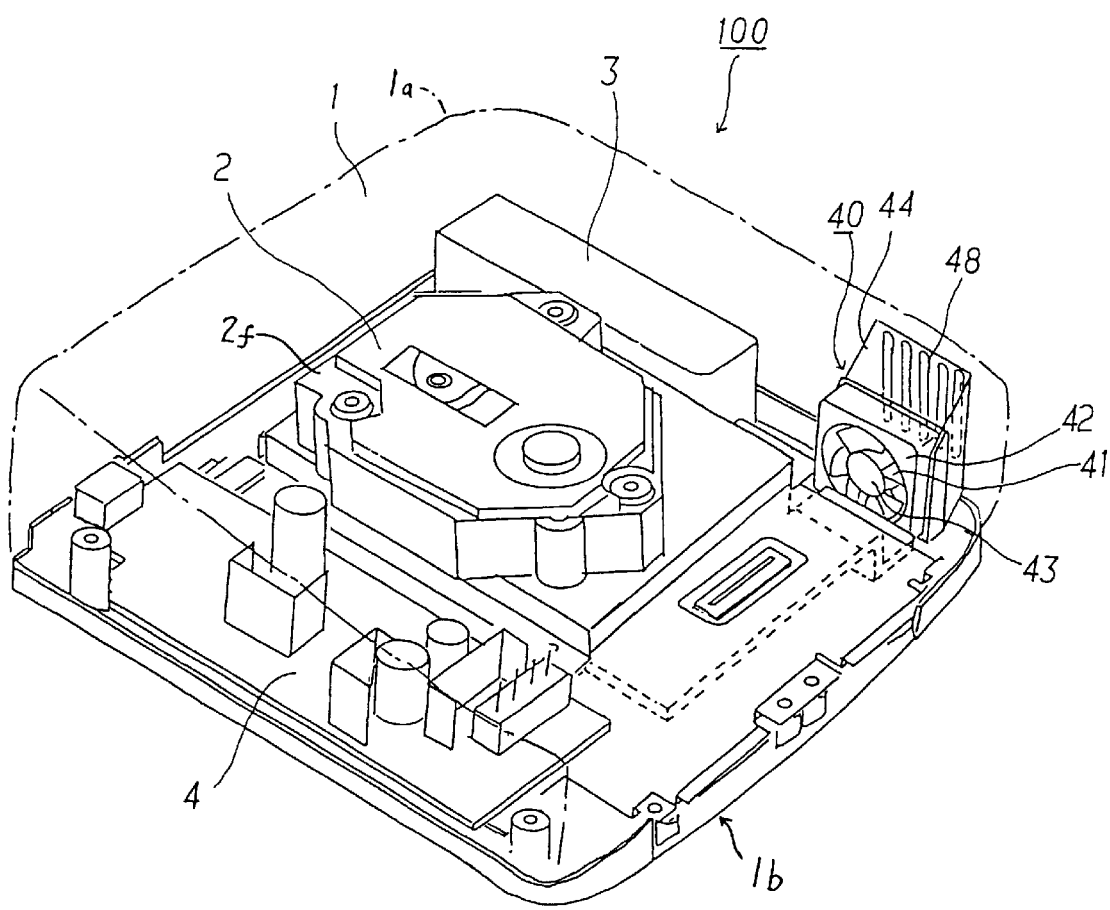
FIG. 1 is a perspective view of the cooling unit of the present invention used in an electronic control device that is a home video game unit.

FIG. 1 is a perspective view of the cooling unit of the present invention used in an electronic control device that is a home video game unit. The video game unit 100 mounts in a component 1 a drive unit 2 for a disk-like recording medium such as a compact disk or a digital video disk, a detachable modem 3 for external data communication, a power supply unit 4 and a cooling fan mount 40 at a right front side. With the video game unit 100, a control unit reads a program from the recording medium on which computer software has been recorded and, according to that program, produces images which are then output to a television monitor that acts as an output device not shown in the diagram, allowing an operator to enjoy the video game using a separate operating device while looking at the moving images on the television screen. It should be noted that the component 1 is a box-like structure formed by combining an upper component 1a and a lower component 1b.

Figure 2:
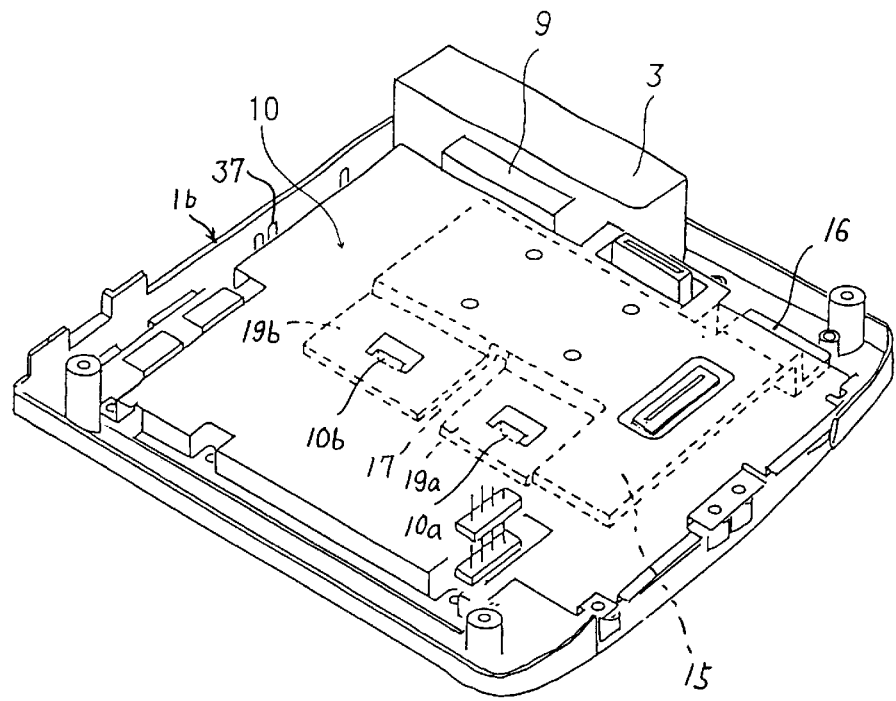
FIG. 2 is a perspective view of the video game unit of FIG. 1 from which the disk drive unit for a disk-like recording medium and the power unit have been removed.

FIG. 2 is a perspective view of the video game unit of FIG. 1 from which the disk drive unit for a disk-like recording medium and the power unit have been removed.

Figure 3:
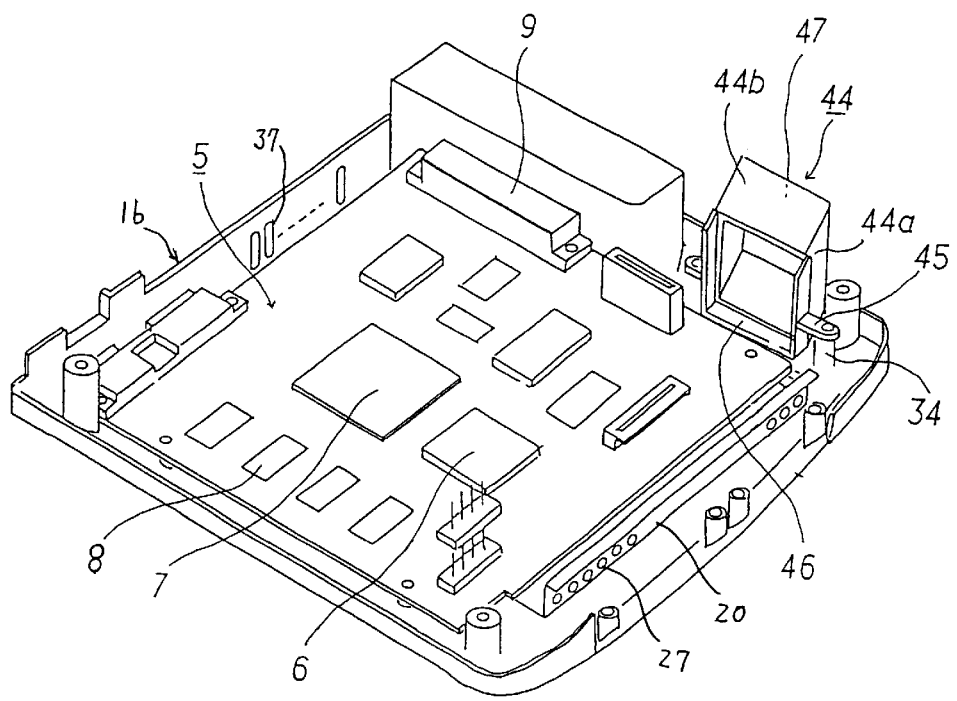
FIG. 3 is a perspective view of the electronic circuit board control device of the video game unit of FIG. 2.

FIG. 3 is a perspective view of the electronic circuit board control device of the video game unit of FIG. 2.

Semiconductor integrated circuits and other electronic parts that form the control unit are mounted on the electronic circuit board 5, as are arranged a variety of connector parts such as for a central processing unit (CPU) 6, a video display processor (VDP) 7, memory devices (RAM, ROM) 8 etc., or a modem connection connector 9, which operate on the basis of oscillation frequencies generated by a crystal oscillator.

The central processing unit (CPU) 6 and video display processor (VDP) 7 formed by these integrated circuits have been made denser, more highly integrated and faster working in order to improve their performance, such that the faster the operating speed of the accompanying oscillation frequency and the more the amount of power consumed, the greater the amount of heat generated by the semiconductor integrated circuit.

Additionally, as the operating speeds of the central processing unit (CPU) 6 and the video display processor (VDP) 7 increase, shallow shield plates 10, 20 made from tin or some other metal that fit around the outside of the electronic circuit board 5 sandwich and cover the entire electronic circuit board 5 from above and below in order to prevent harmful effects from high-frequency wave leakage from the wiring.

Figure 4:
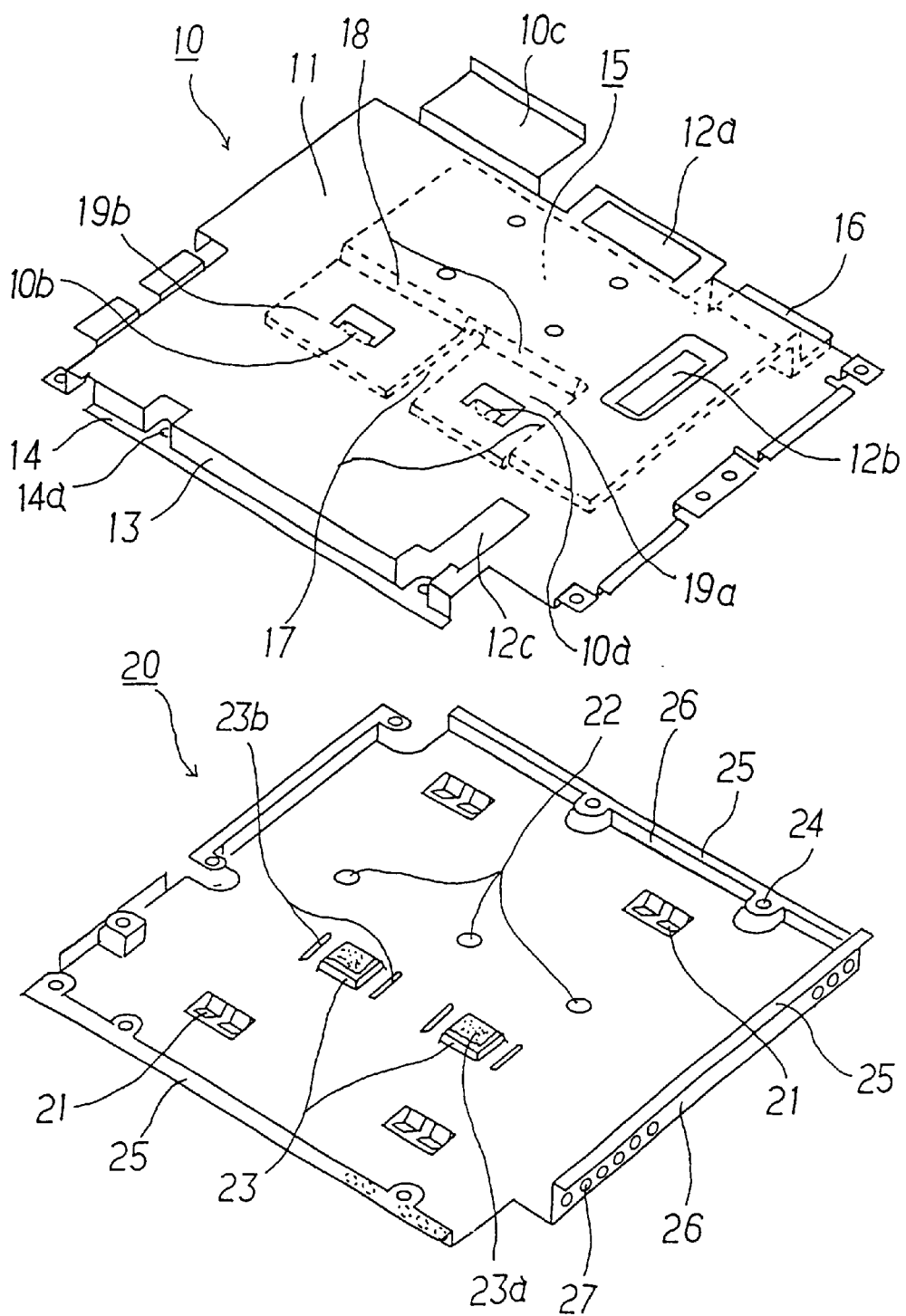
FIG. 4 is a perspective view of an upper shield plate and a lower shield plate.

FIG. 4 is a perspective view of the upper shield plate and the lower shield plate 10, 20.

In order to prevent external leakage of high-frequency electromagnetic radiation generated from the integrated circuit, connector holes 12a, 12b and 12c formed in a flat surface portion 11 corresponding to what would be a ceiling of the upper shield plate 10 have been made as small as possible.

The upper shield plate 10 has the flat surface portion 11 that is higher than a height of the electronic components mounted on the electronic circuit board 5, the four sides of the upper shield plate forming side surface portions 13 that extend along left and right edges of the electronic circuit board 5 and edge portions 14, with screw holes 14a formed along an inner side of the edge portion 14 at appropriate intervals.

The lower shield plate 20 has four leg portions 21 that raise the lower shield 20 slightly above the bottom of the lower component 1b of the video game unit 100, positioning holes 22 for positioning, support bases 23 that contact the electronic circuit board 5 and dissipate heat as well as support the electronic circuit board 5, a plurality of screw holes 24 provided on an edge portion 25 for screwing the upper and lower shields to the electronic circuit board 5, and a group of small holes 27 for the passage of air for cooling formed in front and left side surface 26.

The support bases 23 are in the form of a base, with non-electrically conductive, high heat-transference silicon rubber pads 23a (heat-transferring buffers) affixed to the support bases 23. These silicon rubber pads 23a are thin elastic pads that include a high heat conductivity component, and are attachedly held in place so that the support bases 23 and electronic circuit board 5 can contact each other without a gap therebetween. As a result, the heat generated by the high-heat-producing central processing unit (CPU) 6 and video display processor (VDP) 7 mounted on the electronic circuit board 5 is conducted to the lower shield plate 20 via the silicon rubber pads 23a attached to the rear of the electronic circuit board 5 and the support bases 23. Slots 23b for the passage of air are opened along both sides of support bases 23 of the lower shield 20.

The leg portions 21 are carved out of the lower shield plate 20 in the shape of an inverted "c", with the carved portion bent downward. A shallow side surface 26 is formed along the four sides of the lower shield 20, with an edge portion 25 along an upper edge of each side surface 26 bent. Additionally, the edge portion 25 of the lower shield 20 contacts an edge surface of the back of the electronic circuit board 5.

These plates are made out of a single piece of sheet metal bent into shape.

Figure 5:
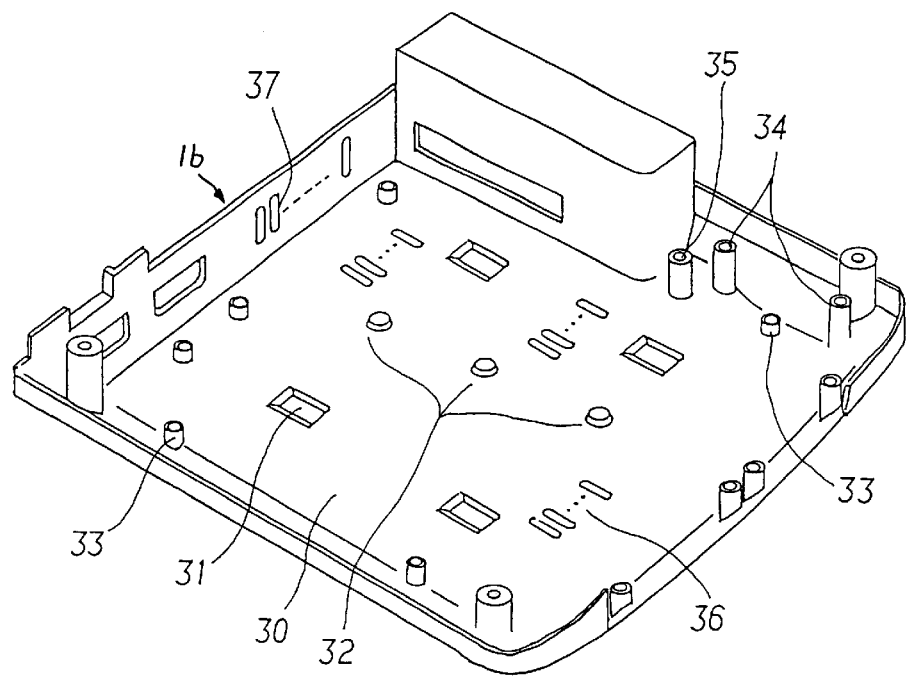
FIG. 5 is a perspective view of an inside floor surface of the component.

FIG. 5 is a perspective view of an inside floor surface of the component.

Openings 31 for accommodating the leg portions are formed in the inner floor surface 30 of the lower component 1b at locations corresponding to the lower shield plate 20. Also formed in the floor surface 30 are a plurality of positioning points 32 and ribs 33 all of identical height positioned at the edge of the electronic circuit board 5. Additionally, front and rear fan duct mounts 34 are provided at a right front side, with a rib 35 for a disk-like recording medium disk drive unit provided further inward and ventilation holes 36 for introducing air from the outside for cooling purposes are formed in the floor.

Additionally, vertical slots 37 for introducing air from the outside for cooling purposes are formed on a right rear wall of the upper component 1a.

Figure 6:
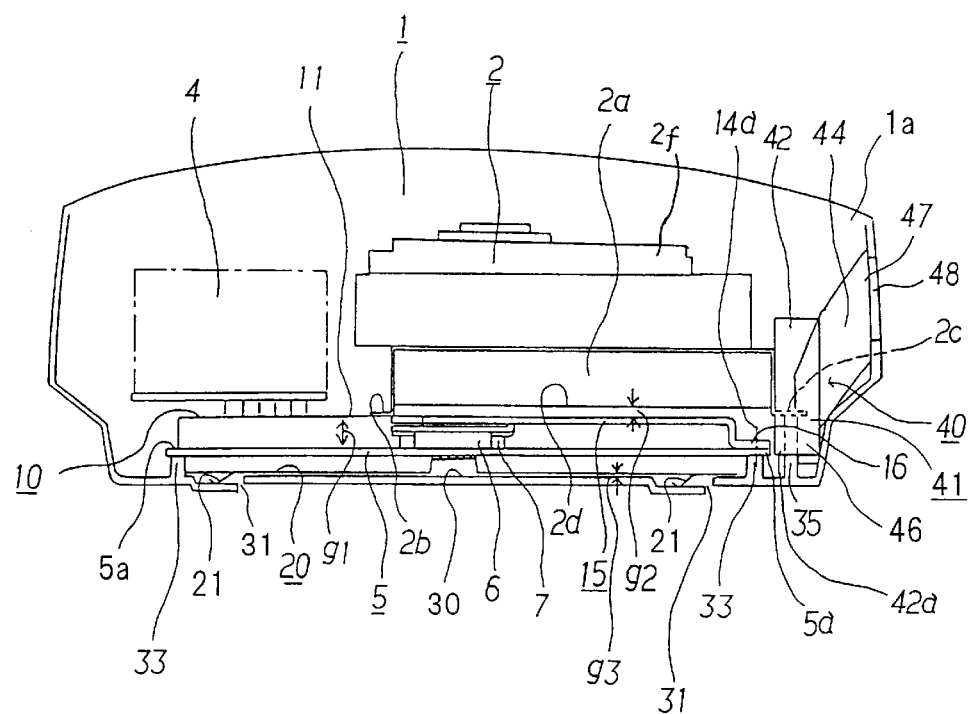
FIG. 6 is a partial cutaway front view of the video game unit.
Figure 7:
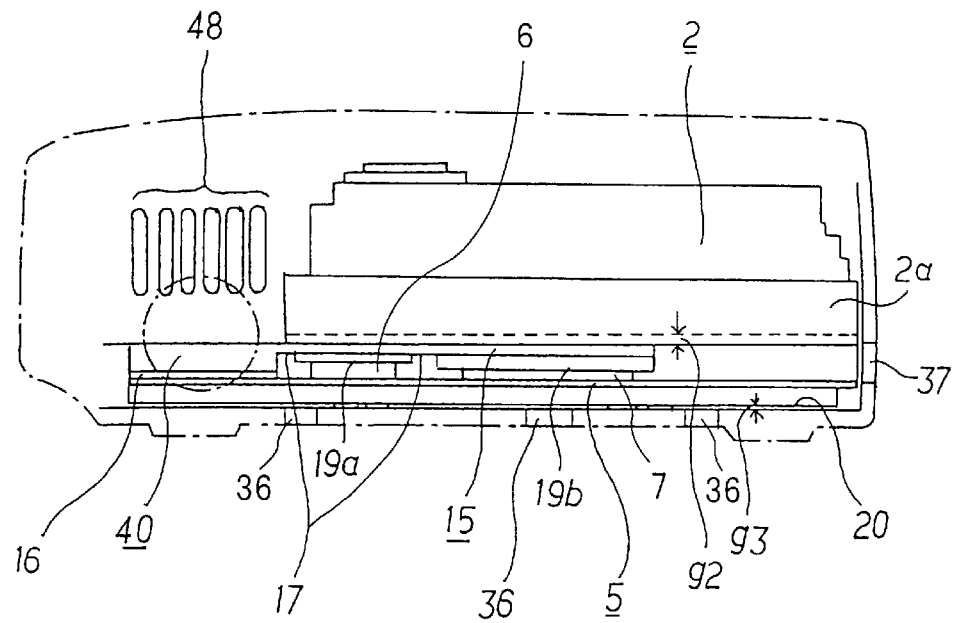
FIG. 7 is a right lateral cutaway view of the video game unit.

FIG. 6 is a partial cutaway front view of the video game unit. FIG. 7 is a right lateral cutaway view of the video game unit.

Upper shield plate 10 is disposed opposite an upper surface of the electronic circuit board 5 and in tandem with the lower shield plate 20 sandwiches the electronic circuit board 5. Additionally, the four edges of the upper shield plate 10 contact an edge surface portion 5a of the electronic circuit board 5 with a high wall surface having a height greater than the height of the electronic components mounted on the electronic circuit board 5 except for the right rear modem connector and power connector positions, and is screwed to the ribs 33 in lower component 1b via the electronic circuit board 5 and the lower shield plate 20 using the screw holes 14a provided on the edge portion. In this state, the upper surface of the upper shield plate 10 is higher than the height of the electronic components, such that a gap g1 exists between the upper shield plate 10 and the electronic circuit board 5. Connector openings are provided in the flat surface portion 11 of the upper shield to accommodate the passage of connectors from the board as necessary, affording connection to other assemblies.

Referring also to FIG. 4, it can be seen that an aluminum plate 15 having good heat conductivity (a heat-receiving plate 15) surficially contacts and is integrally and fixedly mounted to a back side of the right front of the flat surface portion 11 of the upper shield plate 10 via fixing members such as rivets. The aluminum plate 15 has good heat conductivity and is also malleable, low-cost and easy to use.

The aluminum plate 15 is substantially square in shape, surficially contacts the upper surfaces of high heat-producing integrated circuits such as the CPU 6 and the VDP 7 and has an edge portion 16 along a right front edge that is bent downward so as to extend parallel to the edge portion 5a of the electronic circuit board 5. Additionally, the aluminum plate 15 is fixedly mounted to the ribs 33 via the edge portion 16, the electronic circuit board 5, the lower component 1b and the screw holes 24 using the screw holes 14a in the upper shield plate 10. In order to increase the cooling effect due to the flow of air, this edge portion 16 (cooling portion) of the aluminum plate 15 extends to the location of the intake port of the fan mount 40 of the component 1.

In the video game unit 100, heat is generated mainly by the high-density CPU 6 and VDP 7. As a result, in the present embodiment, in order to dissipate the heat generated by the high heat-producing, high-density integrated circuits that make up the CPU 6 and VDP 7 and prevent overheating, contacting planes 19a, 19b bent toward a bottom surface of the aluminum plate 15 are made to contact the CPU 6 and VDP 7. By so doing, the heat of the CPU 6 and VDP 7 is transferred to the aluminum plate 15 via the contacting planes 19a, 19b. Normally, the CPU 6 and VDP 7 are formed into a thin square shape and mounted atop the electronic circuit board 5, and it is common for the height of these elements to differ slightly depending on the size and height thereof.

In the present embodiment, as shown in FIG. 3, the CPU 6 and VDP 7 as the high heat-producing integrated circuits are mounted approximately in a front center of a substantially square electronic circuit board 5, the CPU 6 and VDP 7 having different heights.

Figure 8:
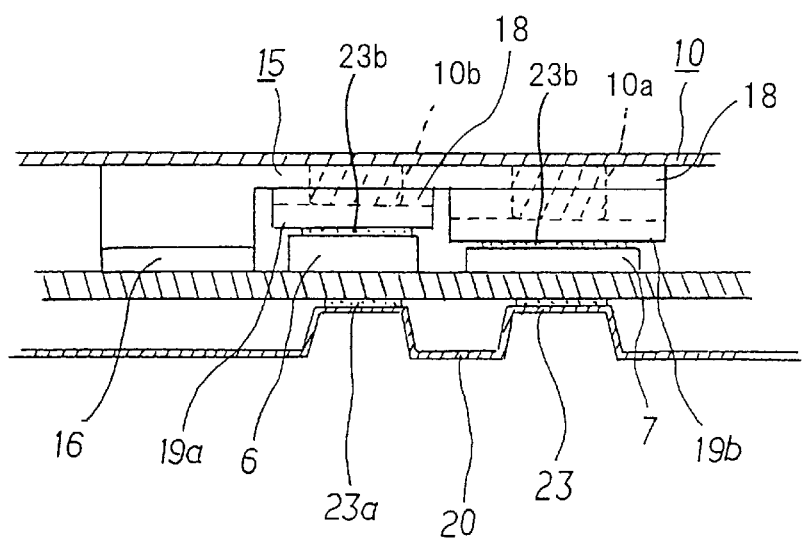
FIG. 8 is an enlarged view of the electronic circuit board and aluminum plate portion of the video game unit shown in FIG. 7.

As shown in FIGS. 4, 7 and 8, two separate but parallel grooves 17 are cut into the aluminum plate 15 at portions corresponding to the CPU 6 and VDP 7 and form regions corresponding to the CPU 6 and VDP 7, with a crank-like step portion 18 formed by bending the notched portion along a periphery of the aluminum plate 15. Further, the contacting plane 19a for contacting the CPU 6 and the contacting plane 19b for contacting the VDP 7 extend from an edge of the step portion 18 so as to be able to contact upper surfaces of the CPU 6 and VDP 7. Tabs 10a, 10b formed in the shape of an inverted "c" are bent downward from the upper shield plate 10 at a portion of the step portion 18 of the aluminum plate that would correspond to the upper surface of the CPU 6 and VDP 7, and these tabs 10a, 10b support the contacting planes 19a, 19b which are the stepped surface pressed from above into contact with the upper surfaces of the CPU 6 and VDP 7. Additionally, the edge portion 16 along the right front edge of the of the aluminum plate 15 provided with a step equal to a width of the fan contacts the board edge 5a as shown in FIG. 6, and is positioned directly in front of the intake opening of the fan 41.

FIG. 8 is an enlarged view of the electronic circuit board and aluminum plate portion of the video game unit shown in FIG. 7.

Heat conductive silicon rubber pads 23b are affixed to the upper surfaces of the CPU 6 and VDP 7, with the contacting surfaces 19a, 19b of the aluminum plate 15 contacting the upper surfaces of the CPU 6 and VDP 7 via the silicon rubber pads 23b. Accordingly, the heat generated by the CPU 6 and VDP 7 is conducted to the aluminum plate 15 via the silicon rubber pads 23b. Further, because the surface of the aluminum plate 15 contacts the upper shield plate 10 as shown in FIG. 6, the heat is conducted across the entire upper shield plate 10 and at the same time to the fan mount 40 and then to the edge portion 16 via the aluminum plate 15.

A drive unit 2 for a disk-like recording medium (CD-ROM) is mounted atop the aluminum plate 15 at the point where the aluminum plate 15 contacts the upper shield plate 10. Further, the drive unit 2 mounted on the upper surface of the upper shield plate 10 is stably supported by the aluminum plate 15 and the upper shield plate 10. Additionally, the drive unit 2 is covered by a resin-like case 2f, so that dust moved by currents of air flowing from the fan 41 are prevented from attaching to the pick up contained therein.

Further, this portion of the upper shield plate 10 on which the drive unit 2 is mounted conducts heat from surface contact with the aluminum plate 15, and becomes hot. As a result, the drive unit 2 straddles this contacting portion, and is mounted on a substantially square base 2a with said square base contacting and screwed to the upper shield plate 10 by horizontally bent leg portions 2b, 2c along both sides of the base 2a. Additionally, the left leg portion 2b of the base 2a of the drive unit 2 is screwed to the upper shield plate 10 at a position contacting an outer side of the mounting position of the aluminum plate 15. Further, the right front leg of the base 2c is screwed to the rib 35 provided on the lower component at a position exceeding a right side edge of the upper shield plate 10, with a right rear side surface mounted as is atop the modem connection connector step portion 10c of the upper shield plate 10 (see FIG. 4). This step portion 10c rises above the upper shield plate 10, and is separate from the aluminum plate 15.

Drive circuitry is contained within the base 2a of the drive unit 2. Additionally, a floor 2d of the base is covered with a metal plate at a height slightly above that of the left and right leg portions 2b, 2c and the base 2a mounted at a slight gap g2 from the upper shield plate 10.

Accordingly, when the fan 41 rotates, air flows through the above-described gap g2 to allow cooling, and at the same time heat from the aluminum plate 15 is not permitted to be transmitted from the upper shield plate 10 directly to the drive circuitry of the drive unit 2.

As shown in FIG. 1, the fan 41 is provided on the fan mount 40, with the fan 41 provided inside an oblong casing 42. Further, the casing 42 has a circular opening in the center, with a fan motor 43 for rotatably driving the fan 41 provided in the center of the opening. The fan 41 has a plurality of blades on a periphery of a cylindrical portion that is rotatably driven by the fan motor 43, and is mounted at an intake port 46 of a slanted duct 44.

The slanted duct 44 shown in FIG. 3 has left and right lateral surfaces 44a formed into a parallelogram slanted upward to an opening, with slanted and parallel upper and lower side surfaces 44b reaching the upper component 1a. Arm tabs 45 provided on both sides of the slanted duct 44 are fixedly mounted by screws to ribs 34 provided on the inside of the lower component 1b.

The slanted duct 44 is mounted so that the intake port 46 forms a square opening, with the casing 42 of the fan 41 located inside the duct intake port 46 such that the axis of rotation of the fan 41 is sideways.

With such an arrangement, the fan 41 is mounted on the duct intake port 46, at the bottom of the lower component 1b. A duct exhaust port 47 contacts vertical slots opened in the upper component 1a and is securely attached to the inner wall of the upper component 1a. As a result, the fan 41 is placed at a predetermined distance from the exhaust port 48, and the exhaust contacts the grating of the exhaust port 48 and does not return to the interior of the component 1. Additionally, the fan 41 is not directly adjacent to the exhaust port 48, so the flow of air through the exhaust port 48 is not easily disturbed and the noise generated by airflow disturbance is reduced.

The edge portion 16 of the aluminum plate 15 that contacts the electronic circuit board 5 is adjacent to a front of a bottom of the casing 42 of the fan 41, at a position through which the flow of air generated by the rotation of the fan 41 passes.

In the fan portion 40 having the structure as described above, the rotation of the fan 41 forcibly discharges the air inside the component 1 to the outside of the component. The heat generated inside the component 1 is discharged by the airflow generated by the rotation of the fan 41.

A description will now be given of the process of discharging the heat generated inside the component.

In addition to the CPU 6 and the VDP 7, the heat-producing elements provided inside the component 1 include the drive unit 2 for the disk-like recording device, the regulator IC for the power board positioned at the left side of the upper shield plate 10 and so forth, with heat generated substantially throughout the interior of the component 1.

As can be seen in FIGS. 6–8, the aluminum plate 15 contacts the upper surfaces of the CPU 6 and VDP 7 that generate heat atop the electronic circuit board 5 via the silicon rubber pads 23b. The heat generated by the CPU 6 and VDP 7 is transmitted to the aluminum plate 15 and reaches the step portion 18 on the right front side of the aluminum plate 15, and is also transferred to the upper shield plate 10 from the portion of the upper shield plate 10 that contacts the surface of the aluminum plate 15.

The drive unit 2 for the disk-like recording medium is mounted above the contact portion of the surface of the upper shield plate 10 with the bottom of the drive unit 2 separated from the upper shield portion by the slight gap g2, so the heat from the contact portion of the surface of the upper shield plate 10 is dissipated in the gap g2.

The fan 41 is located so that a bottom surface 42a of the casing 42 is adjacent to the right front edge 16 of the aluminum plate 15, with the result that the rotation of the fan 41 generates a flow of air through the above-described gap g2 and the surface of the edge portion 16 and the heat dissipated from the contacting surface portion of the upper shield plate 10 and the edge portion 16 is expelled directly together with the flow of air toward the slanted duct 44. Additionally, since the slanted duct 44 is slanted, the expelled air hits the slanted surface and changes direction, and is discharged outside the component 1 from the duct exhaust port 47 through the exhaust port 48. The inner walls of the duct intake port 46 enclose the exterior of the casing 42 of the fan 41, so the air discharged into the interior of the slanted duct 44 does not leak from the duct intake port 46. For this reason the airflow generated by the rotation of the fan 41 is efficiently discharged to the outside.

Further, the fan 41 draws and discharges air from the space inside the upper component 1a and the upper shield plate 10, so the heat dissipated into the space between the upper shield plate 10 and the bottom of the drive unit 2 for the disk-like recording medium is drawn with the air and discharged from the exhaust port 48 to the exterior.

The fan mount 40 is positioned inward of and below the exhaust port 48 of the component 1, so the noise of rotation of the fan 41 does not leak to the outside of the component 1 as easily as is the case when the fan mount 40 is attached directly to the exhaust port 48.

Accordingly, providing the fan 41 at a distance from the exhaust port 48 allows the rpm of the fan 41 to be increased without any change in the level of fan rotation noise leaking to the outside compared to a case in which the fan 41 is attached directly to the exhaust port 48, and at the same time the volume of air which can be discharged can be increased.

As shown in FIGS. 3 and 7, the rear of the lower component 1b is provided with a group of vertical intake slots 37 at a height equal to the position at which the electronic circuit board 5 is installed, and, as shown in FIGS. 6 and 7, a slight gap g3 formed by leg portions 21 of the lower shield plate 20 is provided between the inner floor 30 of the lower component 1b and the lower shield plate 20, so air from outside can be introduced from the ventilation holes 36 formed in the floor of the lower component 1b and the openings 31 for accommodating the leg portions formed in the lower shield plate 20.

When the fan 41 rotates and the air inside the component 1 is discharged from the exhaust port 48, the air pressure inside the component 1 drops below the pressure of the atmosphere and outside air can be drawn in via the intake slots 37 at the rear of the lower component 1, the ventilation holes 36 in the floor of the component and the openings 31 for accommodating the leg portions.

The air taken in via the intake slots 37 and the ventilation holes 36 flows within the component 1 in such a way as to envelope the upper and lower shield plates 10, 20, and at the same time, the heat dissipated from the shield plates 10, 20 and the fins of the regulator that generates the heat from the power supply circuit is discharged to the outside of the component 1. Additionally, it is possible to circulate air internally inside the upper and lower shield plates 10, 20 from the connector and screw holes. As a result, as the heat generated by the electronic circuit board 5 is forcibly discharged by the fan 41 a flow of air is generated inside the upper and lower shield plates 10, 20 as well. Accordingly, the airflow generated by the rotation of the fan 41 discharges the heat generated at the upper and lower surfaces of the electronic circuit board 5 sandwiched by the upper and lower shield plates 10, 20 to the outside of the upper and lower shield plates 10, 20 and to the outside of the component 1 via the exhaust port 48.

Figure 9:
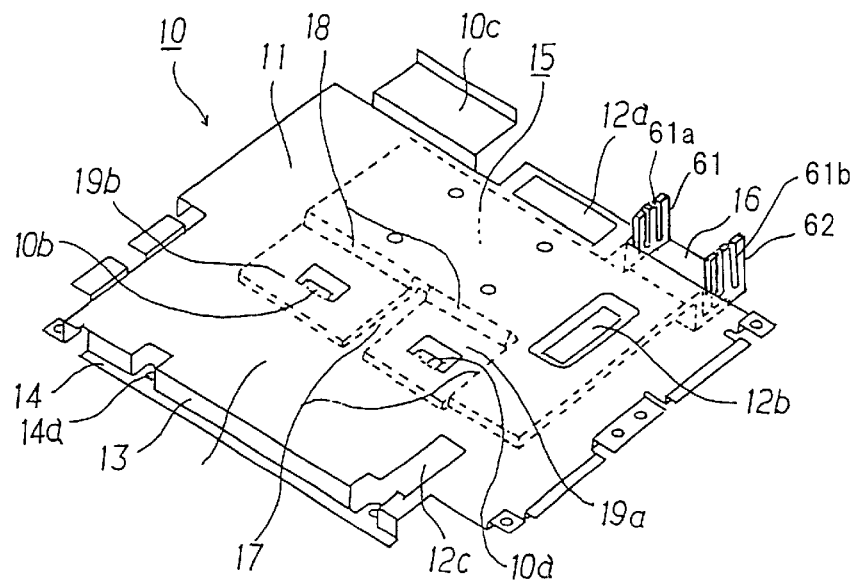
FIG. 9 is a perspective view of a variation of a heat-dissipating portion of the aluminum plate 15.
Figure 10:
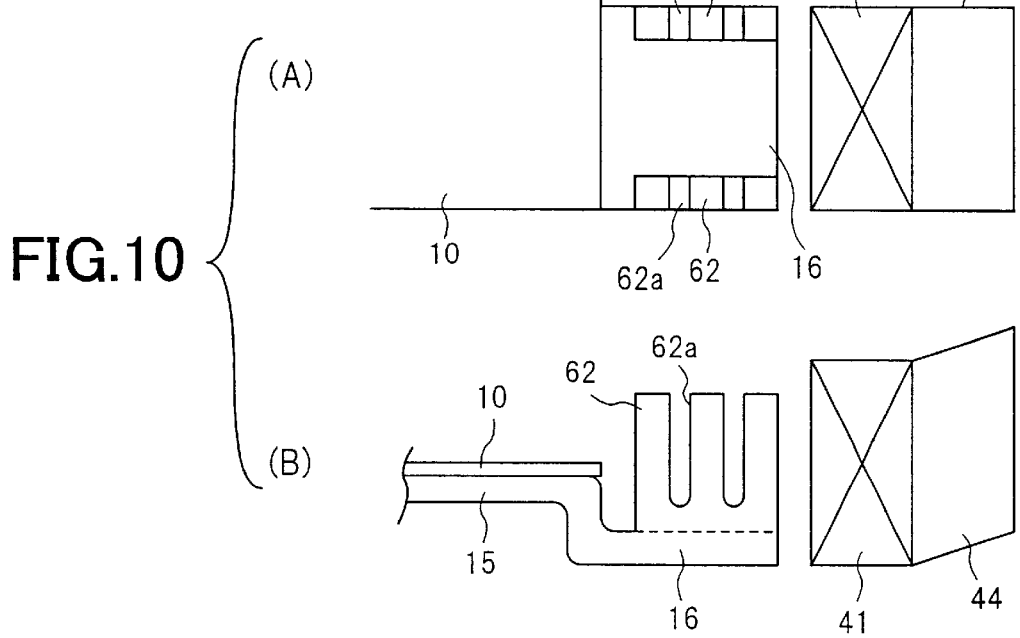
FIG. 10 shows enlarged (A) plan and (B) lateral views of an essential portion of a variation of the heat-dissipating portion of the aluminum plate 15.

FIG. 9 is a perspective view of a variation of a heat-dissipating portion of the aluminum plate 15. FIG. 10 shows enlarged (A) plan and (B) lateral views of an essential portion of a variation of the heat-dissipating portion of the aluminum plate 15.

As shown in FIGS. 9, 10A and 10B, prong-like heat-dissipating fins 61, 62 are formed along both sides of the edge 16 of the aluminum plate 15 so as to project upward. These heat-dissipating fins 61, 62 have a plurality of grooves 61a, 62a that increase the heat-dissipating surface area and enhance the cooling effect of the airflow. Additionally, the edge portion 16 and heat-dissipating fins 61, 62 are positioned adjacent to the front of the intake port of the fan 41. As a result, the airflow generated by the rotation of the fan 41 passes over the surface of the edge portion 16 and the heat-dissipating fins 61, 62 as well as through the plurality of grooves 61a, 62a.

The cooling of the edge portion 16 and the heat-dissipating fins 61, 62 is enhanced as a result, with the heat conducted to the aluminum plate 15 being actively conducted to the edge portion 16 and the heat-dissipating fins 61, 62 and dissipated at the heat-dissipating fins 61, 62 and making it possible to improve the cooling effect with respect to the heat inside the component 1 as well.

The fan 41 adopted in the present electronic device is one that is readily available in the market, with the fan rotation control unit and the fan motor 43 forming a single assembly and including also a rotation sensor 43a for detecting whether or not the fan motor is rotating. This rotation sensor 43a is an open collector output type ordinarily capable of an emergency sensor output, the sensor output signal being, for example, a type that outputs a pulse signal when the fan is rotating or a type that outputs a binary HIGH-level (hereinafter "H-level") or LOW-level signal (hereinafter "L"-level).

The following description relates to a case in which a rotary sensor 43a of a type outputting a pulse signal during rotation is used.

Figure 11:
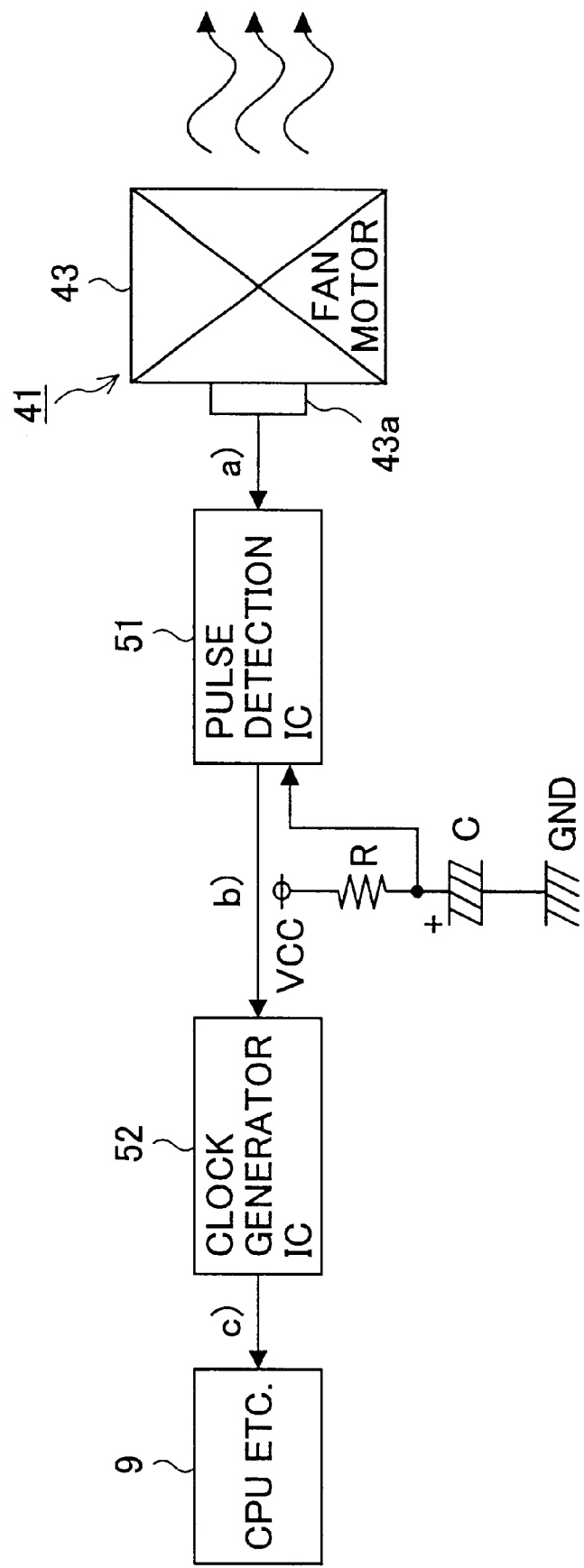
FIG. 11 is a control block diagram of a fan-cooled embodiment.
Figure 12:
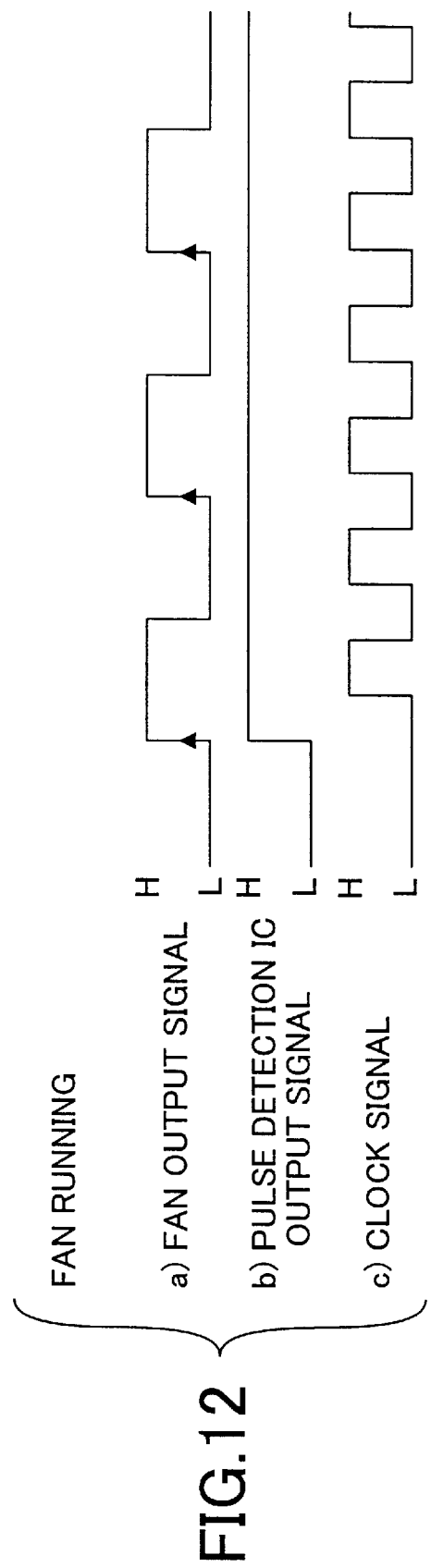
FIG. 12 is a time chart for when the fan is operating.
Figure 13:
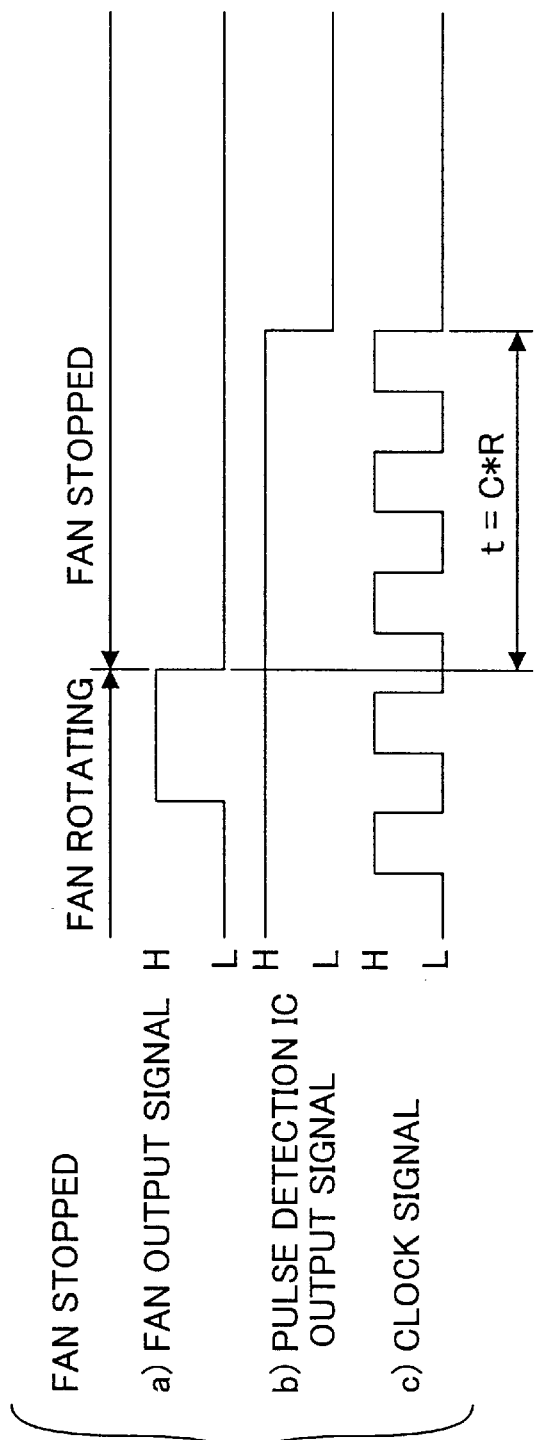
FIG. 13 is a time chart for when the fan is stopped.

FIG. 11 is a control block diagram of a fan-cooled embodiment. FIG. 12 is a time chart for when the fan is operating. FIG. 13 is a time chart for when the fan is stopped.

As shown in FIG. 11, the video game unit 100 is provided with a fan operation output means comprising a rotation sensor 43a for detecting the rotation of the fan motor 43, a pulse detection IC 51 for determining whether or not there is a pulse from the rotation sensor 43a, and a clock generator 52 for controlling the output of a clock pulse supplied to the CPU 9 based on the results of the determination made by the pulse detection IC 51.

The fan motor 43 of the fan 41 is supplied with motive power from an electric power line not shown in the drawing. The fan motor 43 is equipped with a rotation sensor 43a for detecting rotation. The rotation sensor 43a starts detecting rotation of the fan motor 43 when motive power is supplied from a power source to the fan motor 43, and outputs a per-cycle pulse signal with one rotation of the fan motor 43. Accordingly, if the fan motor 43 is rotating normally, then the rotation sensor 43a outputs a regular pulse signal per cycle as the fan output signal.

The fan output signal is supplied via a sensor line to a sensor determination signal input terminal of the pulse detection IC 51. The pulse detection IC 51 is composed of a monostable multivibrator logic circuit. If the fan motor 43 is operating properly, the fan output signal is a pulse of repeating L-level, H-level signals as shown in FIG. 12(a). As shown in FIG. 12(b), the pulse detection IC 51 receives the edge of the pulse signal of the fan output signal and outputs an H-level signal as the output signal (b) to an output enable terminal of the clock generator 52 while pulse signals are being continuously input. Whether or not the pulse signals are continuous is determined by whether or not there is a succeeding pulse signal input within the time constant of the oscillating circuit as determined by the values of the nominal resistance R of the pulse detection IC 51 and the electrolytic capacitor C.

As shown in FIG. 12(c), the clock generator 52 outputs clock signals (c) required by the CPU 9 and other integrated circuits while H-level signals are being input into the output enable terminal.

Accordingly, when the fan motor 43 is operating properly, the fan output signal (a) from the rotation sensor 43a is detected by the pulse detection IC 51 and a clock signal (c) is supplied from the clock generator 52 to the CPU 9 and so forth so that the control circuit can be operated properly.

If the fan motor 43 of the fan 41 stops rotating for some reason, such as a foreign object becoming stuck to the blades, then the pulse signal that had been output during the rotation of the fan 41 as the fan output signal from the rotation sensor 43 stops being output, and the fan output signal (a) remains at L-level as shown in FIG. 13.

In that event, the signal input to the sensor determination signal input terminal of the pulse detection IC remains at L-level. At the same time, the resistance R and the capacitor C of the pulse detection IC 51 are connected in series between the supply voltage Vcc and the ground GND, so a signal is received at a positive electrode of the electrolytic capacitor C and an H-level signal is output during the time constant t as determined by the values of the resistance R and the capacitor C as the output to the enable terminal of the clock generator 52, and after a delay of time constant t the signal becomes L-level (delaying means).

With the discharge of the signal from the positive electrode of the electrolytic capacitor C, the electrolytic capacitor C begins to collect current supplied from the power supply Vcc via the resistance R. The charging time of the electrolytic capacitor C is determined by the values of the resistance R and the electrolytic capacitor C. The pulse detection IC 51 has a time constant $t=C \times R$ and has a threshold value equal to the charged voltage of the electrolytic capacitor at this time. If no succeeding fan output signal pulse comes during this time interval, then the output signal becomes L-level.

When the output signal from the pulse detection IC 51 switches to L-level, the clock generator 52 forcibly stops output of the clock signal (c) that had been output to the CPU 9 and so forth. As a result, all operations of the integrated circuits on the electronic circuit board 5 come to a halt and thereafter the generation of heat from the integrated circuits of the CPU 9 and so forth is restrained.

The operator of the unit knows when trouble has occurred because the video and images displayed on a monitor not shown in the diagram freeze when the integrated circuits stop operating, so the operator inspects the video game unit 100 for some sort of trouble. In the process, the inspection will reveal if the fan motor 43 has stopped, and if some sort of foreign object is involved then dislodging it will cause the fan motor 43 to begin turning again. When the fan motor 43 begins to turn the rotation sensor 43a detects the rotation of the fan motor 43, and the fan output signal (a) changes from the L-level state to the alternating H-level, L-level pulse signal shown in FIG. 12(a) and is output to the sensor determination signal input terminal of the pulse detection IC 51.

When the above-described alternating pulse signal is output, the pulse detection IC 51 receives the edge of the pulse signal as shown in FIG. 12(b), and as long as the pulse signal continues an H-level signal is output to the output enable signal input terminal of the clock generator 52. As shown in FIG. 12(c), while the signal input to the output enable terminal is H-level the clock generator 52 outputs a clock signal (c) to the CPU 9 and other integrated circuits to continue the operation of the integrated circuits.

At the same time, although heat is once again generated from the integrated circuit, the fan motor 43 exhausts normally and can forcibly discharge the heat inside the component 1 together with the air inside the component 1 and thus can restrain the generation of heat inside the component 1.

Figure 14:
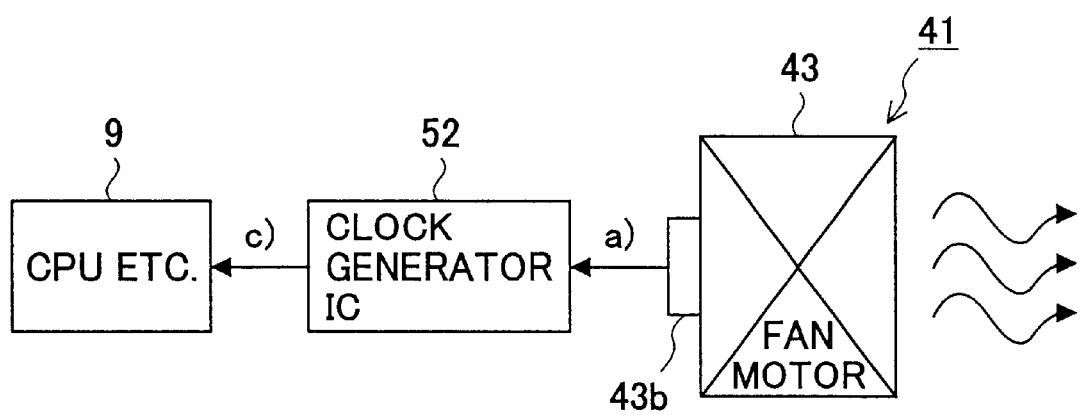
FIG. 14 is a block diagram of a separate first embodiment.

FIG. 14 is a block diagram of a separate first embodiment for detecting the rotation of the fan 41. The following description with reference to FIG. 14 pertains to a type that outputs a binary signal H-level or L-level as the output signal (a) of the rotation sensor 43b for detecting the rotation of the fan motor 43.

The rotation sensor 43b for detecting the rotation of the fan motor 43 is a binary signal output type using the output from an open collector, and is supplied with motive power from a power supply circuit not shown in the drawing.

The fan motor 43 is equipped with the rotation sensor 43b for the purpose of detecting the rotation of the fan 41. When supplied with motive power from the power supply circuit, the rotation sensor 43b begins detecting the rotation of the fan motor 43. The rotation sensor 43b generates an H-level signal as the fan output signal when the fan motor 43 is rotating normally and generates an L-level signal as the fan output signal when the fan motor 43 has stopped. When the fan output signal is input to the output enable terminal of the clock generator 52, the clock generator 52 sends a clock signal to the CPU 9 and so forth while the fan output signal (a) is H-level to cause the integrated circuits to operate normally.

When the rotation of the fan motor 43 stops, the fan output signal becomes L-level, the clock generator 52 stops the clock signal oscillation and the integrated circuits stop operating. Thus, when the fan motor 43 stops rotating the integrated circuits stop operating, so the generation of heat from the integrated circuits can be prevented.

As described above, if the fan output signal (a) from the rotation sensor 43b of the fan motor 43 is abnormal, then the oscillation of the clock generator 52 is stopped, the operation of the integrated circuits is stopped and the generation of heat from the integrated circuits is prevented. However, instead of stopping the oscillation of the clock generator 52 it is also possible to generate a signal that opens the power switch of the power supply circuit (not shown in the drawing).

Figure 15:
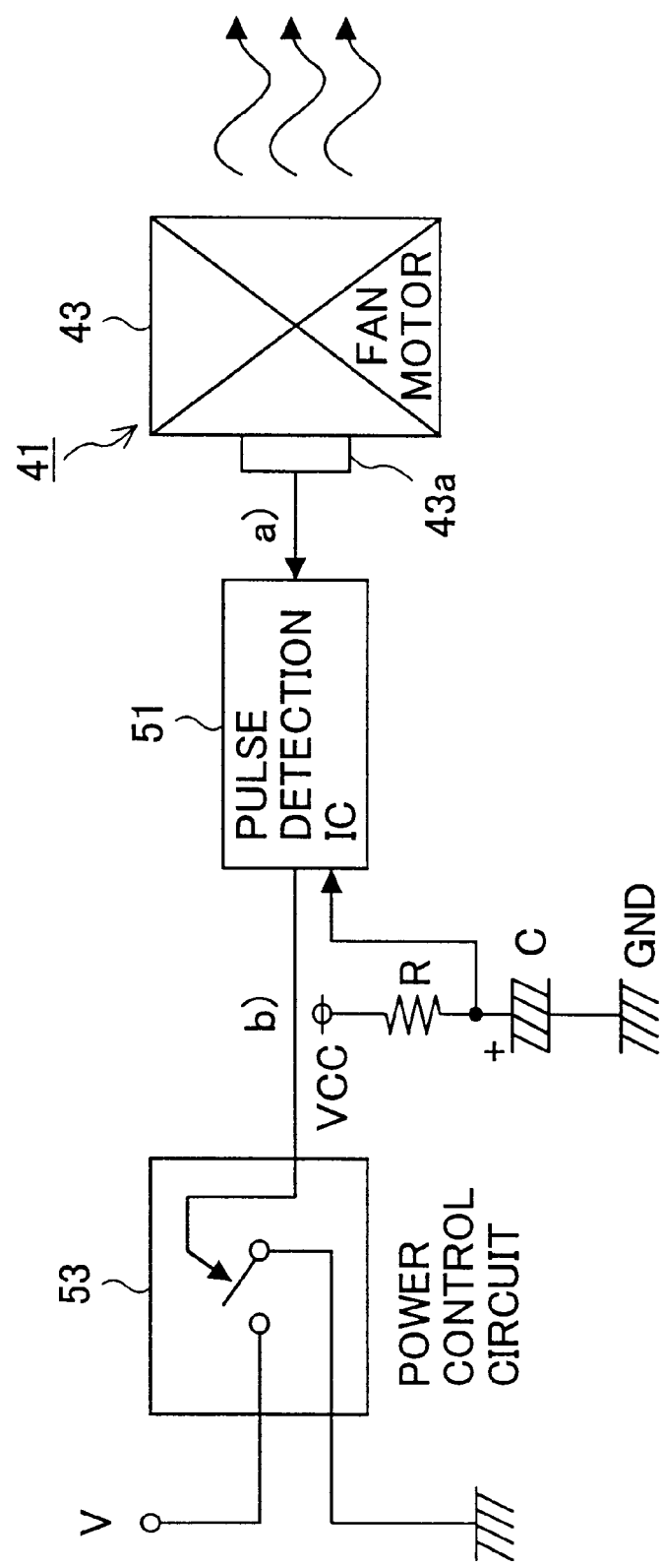
FIG. 15 is a block diagram of a separate second embodiment.

FIG. 15 is a block diagram of a separate second embodiment.

As shown in FIG. 15, the fan output signal (a) from the fan motor 43 rotation sensor 43a is input to the pulse detection IC 51. While the fan output signal (a) is a normal pulse signal, the pulse detection IC 51 outputs an H-level signal to a power control circuit 53. When the fan output signal (a) is an L-level signal indicating that the fan motor 43 is not rotating, the pulse detection IC 51 generates an L-level signal to the power control circuit 53. At an H-level signal from the pulse detection IC, the power control circuit 53 maintains the power supply line of the power supply unit 4 in a closed state and opens the power supply line at an L-level signal.

It should be noted that when the fan output signal (a) from the fan motor 43 is a binary signal there is no need for a pulse detection IC 51, and the fan output signal from the rotation sensor 43a is input to the power control circuit 53.

The power control circuit 53 can be made by using a common power control IC and relay.

Figure 16:
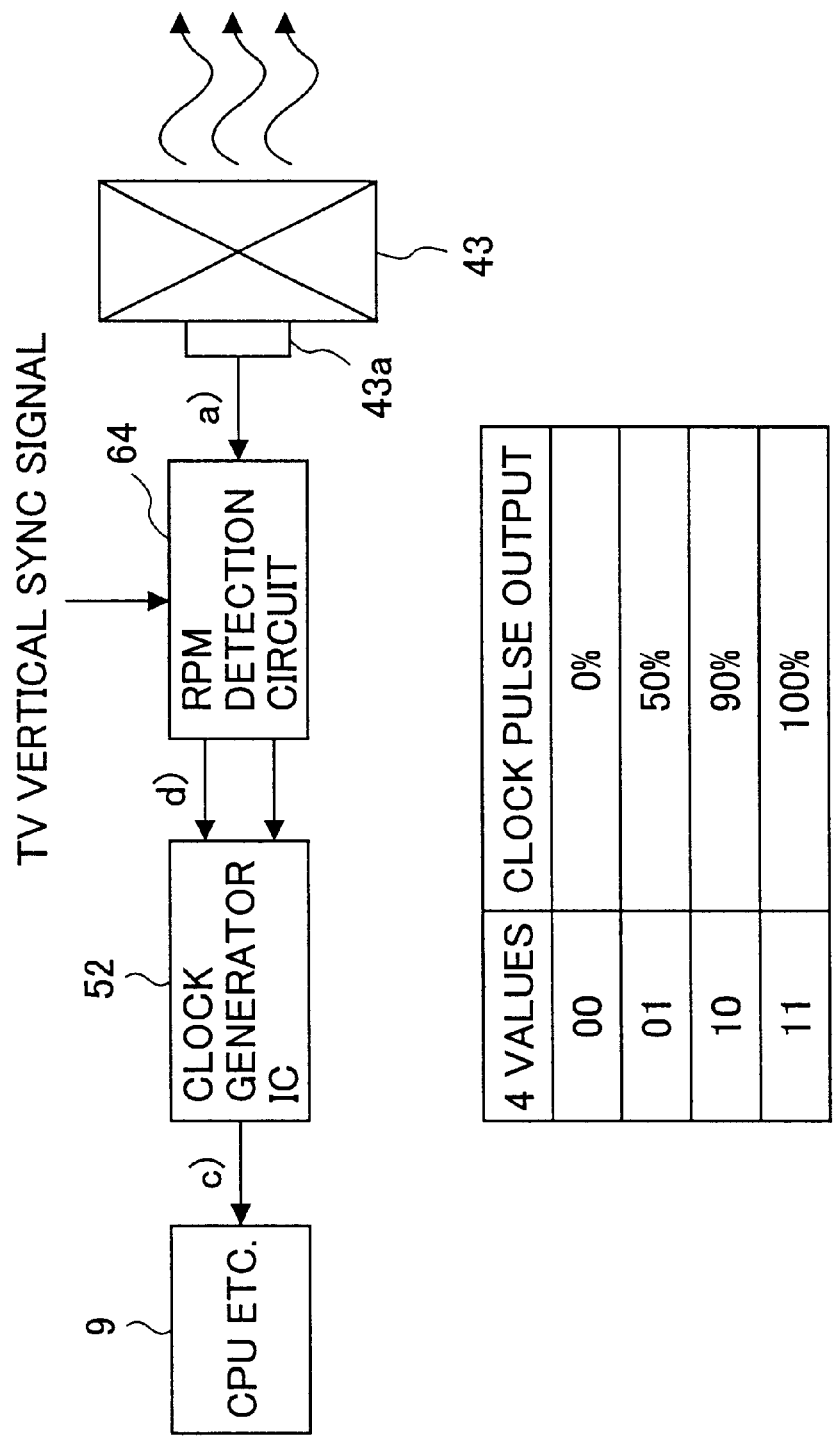
FIG. 16 is a block diagram of a separate third embodiment.

FIG. 16 is a block diagram of a separate third embodiment.

As shown in FIG. 16, the fan output signal (a) from the rotation sensor 43a is input to an rpm detection circuit 64 together with a TV vertical sync signal output when an image is displayed. The RPM detection circuit 64 then counts the fan output signal (a) from the rotation sensor 43a input between the TV vertical sync signals. When an image is displayed on the monitor, a TV vertical sync signal is output at an interval of 1/60 second (a frequency of 60 Hz). In other words, the rpm detection circuit 64 ascertains the rotational state of the fan motor 43 based on the count of the fan output signal (a) input every 1/60 of a second and, based on the results of that determination, selects and outputs one signal out of a possible four signals (00, 01, 10, 11).

The clock generator 52 reduces in stages the number of clock pulse pulses to be output based on the combination of signals output from the rpm detection circuit 64. For example, when the determination signal (d) from the rpm detection circuit 64 is "11" the fan motor 43 is rotating normally, so the clock pulses are output at the normal frequency (100%). When the determination signal (d) from the rpm detection circuit 64 is "10" the fan motor 43 rotation speed has been reduced to 90% due to the presence of some load, so the clock pulse is set at 90% of normal. When the determination signal (d) from the rpm detection circuit 64 is "01", the fan motor 43 rotation speed has been reduced to 50% due to some load, so the clock pulse is set at 50% of normal. When the determination signal (d) from the rpm detection circuit 64 is "00" the fan motor 43 is stopped, so the clock pulse is set at 0%.

As described above, the number of pulses in the clock pulse supplied to the CPU 6 can be reduced in stages according to the rotation condition of the fan motor 43, so even if the fan motor 43 encounters some sort of trouble the CPU 6 is not immediately stopped and the sudden freezing of the video image in the middle of a game is prevented.

Accordingly, a person playing the game sees the speed of the image displayed on the monitor slow down and knows that something is wrong, and so can inspect the fan for signs of trouble.

Figure 17:
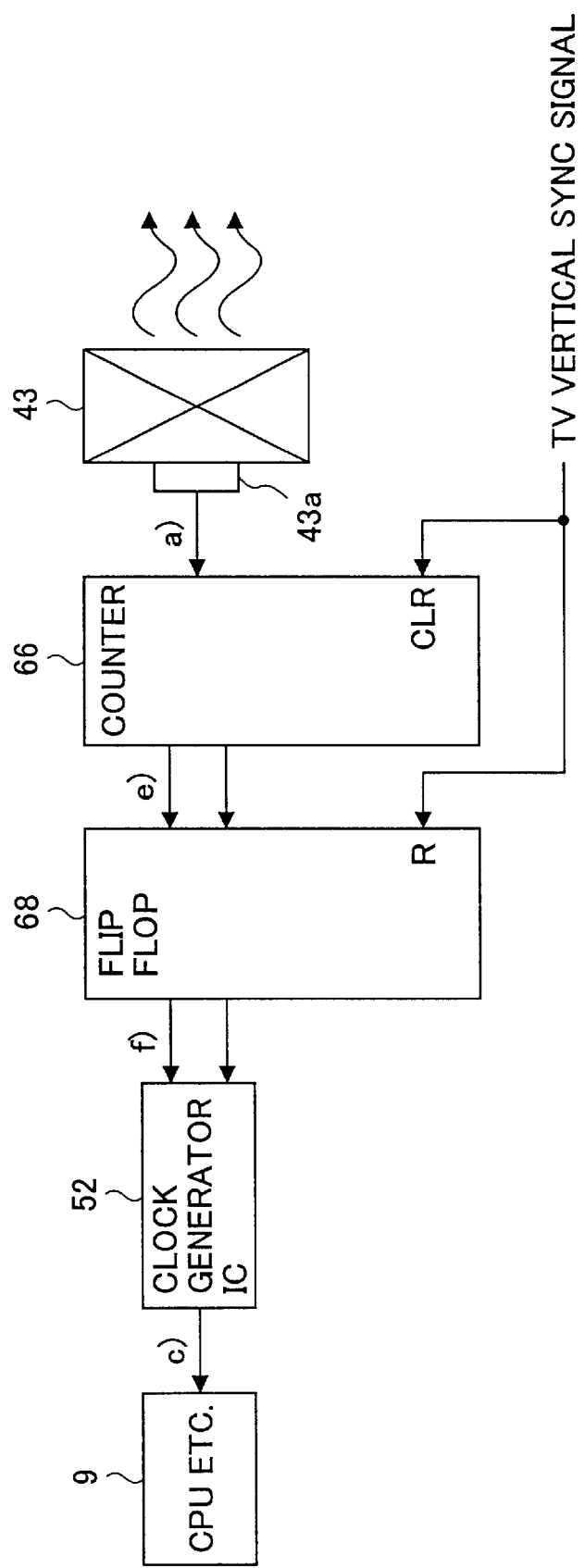
FIG. 17 is a block diagram of a separate fourth embodiment.

FIG. 17 is a block diagram of a separate fourth embodiment.

As shown in FIG. 17, the fan output signal (a) from the rotation sensor 43a is input to the counter 66 together with the TV vertical sync signal output when an image is displayed. The counter 66 counts the fan output signals (a) from the rotation sensor 43a input between the TV vertical sync signals, ascertains the rotation condition of the fan motor 43 based on that count and selects and outputs one signal from the four possible signals (00, 01, 10, 11) based on the results of that determination.

The signals (e) output from the counter 66 and the TV vertical sync signal are input to the flip flop 68. The flip flop 68 retains the signals (e) output from the counter 66 and outputs signals (f) to the clock generator 52, such that when the TV vertical sync signal is input the retained signals (e) are reset.

The operation of the flip-flop 68 involves performing the same processes as the above-described pulse detection IC 51 (see FIG. 12(B), FIG. 13(B)), such as delaying the signals (f) and revising the signals (e) output from the counter 66 using the TV vertical sync signal as a trigger. It should be noted that the signals input to the above-described rpm determination circuit 64 and counter 66 as triggers are not limited to TV vertical sync signals but include a variety of video sync signals for personal computer displays and industrial display monitors, depending on the image to be displayed.

As described above, with the fourth embodiment as well, the number of pulses in the clock pulse supplied to the CPU 9 can be reduced in stages according to the rotation condition of the fan motor 43, so even if the fan motor 43 encounters some sort of trouble the CPU 9 is not immediately stopped and the sudden freezing of the video image in the middle of a game is prevented.

Although the above-described embodiments assume that the fan motor 43 is rotated at a constant speed, the invention is not limited to such embodiments. Rather, the present invention can for example also be adapted to a configuration in which the temperature inside the component 1 is detected by a temperature sensor and the rotation speed of the fan motor 43 is adjusted on the basis of the temperature so detected.

Additionally, although the above-described embodiments refer to a video game unit, the invention can also be adapted to other electronic devices as well.

Additionally, although the foregoing embodiments have been described with reference to a fan 41, a slanted duct 44 and an exhaust port 48 positioned on a side surface of the component 1, the invention is not limited to such an embodiment but instead these components may be positioned at other locations as well.

What is claimed is:

1. In an electronic device mounting therein an electronic circuit module on which electronic components are mounted and having a fan within the electronic device to cool the electronic components on the electronic circuit module, the electronic device comprising:

fan operating output means for detecting a rotation of a fan; and operating control means for controlling an operation of the electronic circuit module based on an operating signal output from the fan operating output unit, wherein the fan operating output means has a delaying means for delaying operation of the electronic circuit module based on a rotation detection signal for detecting the rotation of the fan.

2. In an electronic device mounting therein an electronic circuit module on which electronic components are mounted and having a fan within the electronic device to cool the electronic components on the electronic circuit module, the electronic device comprising:

a fan operating output unit for detecting a rotation of a fan in response to a signal having predetermined intervals received from the electronic components; and an operating control unit for controlling an operation of the electronic circuit module based on an operating signal output from the fan operating output unit.

3. In an electronic device mounting therein an electronic circuit module on which electronic components are mounted and having a fan within the electronic device to cool the electronic components on the electronic circuit module, the electronic device comprising:

fan operating output means for detecting a rotation of a fan; and operating control means for controlling an operation of the electronic circuit module based on an operating signal output from the fan operating output unit, wherein the fan operating output means is triggered by an image synchronization signal and detects the rotational state of the fan.

4. In an electronic device mounting therein an electronic circuit module on which electronic components are mounted to provide video images for display and having a fan that discharges air inside the electronic device to an exterior when the electronic circuit module operates, the electronic device comprising:

a fan operating output unit for detecting a rotation of a fan in response to an image synchronization signal received from the electronic components; and an operating control unit for controlling an operation of the electronic circuit module based on an operating signal output from the fan operating output unit.

5. The electronic device as claimed in claim 4, including a delay means for delaying the detection of the rotation of the fan.

6. The electronic device as claimed in claim 4, wherein the operating control unit changes, in stages, a clock pulse frequency output to the electronic circuit module in response to a detection signal output from the fan operating output unit.

7. The electronic device as claimed in claim 4, wherein the operating control unit for controlling the operation of the electronic circuit module stops a clock generator that supplies a clock pulse to the electronic circuit module.

8. In an electronic device mounting therein an electronic circuit module on which electronic components are mounted and having a fan within the electronic device to cool the electronic components on the electronic circuit module, the electronic device comprising:

a fan operating output unit for detecting a rotation of a fan; and an operating control unit for controlling a degree of operation of the electronic circuit module being cooled by the fan based on the fan rotation rate detected by the fan operating output unit, wherein the fan operating output unit converts the detected rotation rate of the fan into a corresponding numerical value level which indicates a percentage of a maximum rotation rate at which the fan is rotating, further wherein the degree of operation which the electronic circuit module is controlled is a variable degree which is selected to correspond to the numerical value level of the fan rotation rate.

9. In an electronic device mounting therein an electronic circuit module on which electronic components are mounted and having a fan within the electronic device to cool the electronic components on the electronic circuit module, the electronic device comprising:

a fan operating output unit for detecting a rotation of a fan; and an operating control unit for controlling an operation of the electronic circuit module based on an operating signal output from the fan operating output unit, wherein the fan operating output unit is triggered by a signal having predetermined intervals and detects the rotational state of the fan.

10. In an electronic device mounting therein an electronic circuit module on which electronic components are mounted and having a fan within the electronic device to cool the electronic components on the electronic circuit module, the electronic device comprising:

a fan operating output unit for detecting a rotation of a fan; and an operating control means for controlling an operation of the electronic circuit module based on an operating signal output from the fan operating output unit, wherein the fan operating output unit detects the rotational state of the fan at intervals of an image synchronization signal.

* * * * *